UNITED STATES PATENT OFFICE.

FEODOR LEHMANN AND JOHANNES STOCKER, OF BERLIN, GERMANY.

PROCESS FOR MANUFACTURING PLASTIC SUBSTANCES FROM THE DERIVATIVES OF CELLULOSE.

1,191,801.      Specification of Letters Patent.      Patented July 18, 1916.

No Drawing.      Application filed March 16, 1914. Serial No. 825,158.

*To all whom it may concern:*

Be it known that we, FEODOR LEHMANN and JOHANNES STOCKER, subjects of the German Emperor, and residents of Berlin, Germany, have invented certain new and useful Improvements in Process for Manufacturing Plastic Substances from the Derivatives of Cellulose, of which the following is a specification.

In the manufacture of celluloid like substances from cellulose esters it has not heretofore been possible to substitute an equivalent substance for the camphor, which owing to its qualities offers great drawbacks.

Trials have shown that the polymers of cumarone ($C_8H_6O$) and indene ($C_9H_6$) when treated with cellulose esters, produce substances similar to substances prepared by means of camphor without offering the drawbacks of the latter. Furthermore the cost price of said polymers is about one twentieth of that of camphor. For preparing said plastic substances, the polymers of cumarone or indene are added to the solutions of cellulose ester and the mixture is dried. The amount of said added polymers varies according to the desired degree of elasticity of the plastic substances to be prepared. Said substances are indifferent to air and light. They have a bright surface and are nearly inodorous.

For preparing transparent products, the used cumarone resin should be accordingly purified.

Such plastic substances may be prepared for instance as follows: 200 grams of cumarone resin are dissolved in a mixture of sulfuric ether, benzol and alcohol, 100 grams of each, after which 700 grams of nitro-cellulose are added to said liquid solution. A substance is produced which is then treated in the same manner as the solution of nitro-cellulose in the manufacturing of celluloid.

Another similar plastic substance is obtained in the following manner: 600 grams of cellulose acetate are dissolved in 500 grams of tetrachlorethane after which 300 grams of cumarone resin is added. The resulting sticky substance is worked further in the known manner.

The above mentioned proportions are only given by way of example.

Having now fully described our said invention, what we claim and desire to secure by Letters Patent is:

1. Process for manufacturing celluloid like substances consisting in treating cellulose esters by means of the polymers of cumarone and indene previously dissolved in a solvent.

2. Process for manufacturing celluloid like substances consisting in treating cellulose esters by means of the resinous cumarone and indene derivatives of tar oils.

3. Process for manufacturing celluloid like substances consisting in dissolving cellulose acetate in tetrachlorethane and in adding cumarone resin to the solution.

In testimony whereof we have hereunto set our hands in the presence of two witnesses.

FEODOR LEHMANN.
JOHANNES STOCKER.

Witnesses:
  WOLDEMAR HAUPT,
  HENRY HASPER.